United States Patent
Poulsen

(10) Patent No.: US 9,102,240 B2
(45) Date of Patent: Aug. 11, 2015

(54) CHARGING STATION FOR ELECTRIC VEHICLES

(75) Inventor: Peder Ulrik Poulsen, Stratford, CT (US)

(73) Assignee: Poulsen Hybrid, LLC, Shelton, CT (US)

( * ) Notice: Subject to any disclaimer, the term of this patent is extended or adjusted under 35 U.S.C. 154(b) by 496 days.

(21) Appl. No.: 13/452,208

(22) Filed: Apr. 20, 2012

(65) Prior Publication Data

US 2012/0268067 A1    Oct. 25, 2012

Related U.S. Application Data

(60) Provisional application No. 61/517,666, filed on Apr. 25, 2011.

(51) Int. Cl.
*H02J 7/00* (2006.01)
*B60L 11/18* (2006.01)
*B60S 5/00* (2006.01)
*H02M 5/12* (2006.01)
*H02J 7/02* (2006.01)

(52) U.S. Cl.
CPC . *B60L 11/18* (2013.01); *B60S 5/00* (2013.01); *H02J 7/02* (2013.01); *H02M 5/12* (2013.01); *B60L 11/1816* (2013.01); *Y02T 10/7005* (2013.01); *Y02T 10/92* (2013.01); *Y02T 90/127* (2013.01); *Y10T 29/49716* (2015.01)

(58) Field of Classification Search
USPC ........................................................ 320/109
See application file for complete search history.

(56) References Cited

U.S. PATENT DOCUMENTS

| | | | |
|---|---|---|---|
| 5,396,165 A * | 3/1995 | Hwang et al. | 323/210 |
| 7,984,852 B2 | 7/2011 | Outwater | |
| 8,013,570 B2 | 9/2011 | Baxter et al. | |
| 8,072,184 B2 | 12/2011 | Bhade et al. | |
| 2011/0029146 A1 | 2/2011 | Muller et al. | |
| 2011/0055037 A1* | 3/2011 | Hayashigawa et al. | 705/26.1 |
| 2011/0115425 A1* | 5/2011 | Olsson | 320/101 |
| 2011/0140656 A1 | 6/2011 | Starr et al. | |
| 2011/0174875 A1 | 7/2011 | Wurzer | |
| 2011/0216451 A1* | 9/2011 | Haines et al. | 361/42 |
| 2011/0221393 A1 | 9/2011 | Billmaier | |
| 2012/0049794 A1 | 3/2012 | Han et al. | |

* cited by examiner

*Primary Examiner* — Paul Dinh
*Assistant Examiner* — Bryce Aisaka
(74) *Attorney, Agent, or Firm* — St. Onge Steward Johnston & Reens LLC

(57) ABSTRACT

A system and method of supplying 240 volt charging for an electric vehicle, while also allowing for 120 volt electrical devices to be used in the area, includes a charging station having a 240 volt input, a 240 volt electric vehicle charge plug electrically connected to the 240 volt input, a 240 volt to 120 volt step down transformer, a 240 volt side of the step down transformer electrically connected to the 240 volt input, and a 120 volt power outlet electrically connected to a 120 volt side of the step down transformer. The charging station is electrically connected to a 240 volt circuit that has been converted from a 120 volt circuit that has previously existed in the area.

36 Claims, 3 Drawing Sheets

CHARGING STATION FOR ELECTRIC VEHICLES

CROSS-REFERENCE TO RELATED APPLICATIONS

The present application claims the benefit under 35 U.S.C. §119(e) of the U.S. Provisional Patent Application Ser. No. 61/517,666, filed on Apr. 25, 2011, the content of which is incorporated herein by reference.

FIELD OF THE INVENTION

The invention concerns charging stations for electric vehicles, and particularly charging station systems and methods particularly designed for retrofit into homes or other locations with existing wiring.

BACKGROUND OF THE INVENTION

Electric vehicles (EVs) and plug in hybrid electric vehicles (PHEVs) comprise a bank of batteries and an on-board charger, which converts household AC power to DC power at the voltage required for charging the batteries.

Due to the limited mileage of electric vehicles owners usually prefer to recharge at home while drawing power from the grid via a wall mounted charge station in their garages or car ports. Charging is usually performed overnight in order to provide the full mileage range every day. Typically, charge stations comprise a flexible cable and docking station for the dedicated charge connector as well as various control check and safety components.

In the United States, most wall outlets deliver 120 volt power via a circuit breaker in the household electric panel. The majority of homes also have 240V outlets, located in the kitchen or laundry area, which serve to power ranges, washer/dryers and air conditioners. However, in general, circuits serving the garage are only 120V and wired for 15 or 20 amperes, with one circuit feeding several outlets, and effectively limiting power draw to 1800 or 2400 watts respectively. Until the appearance of electric vehicles, garage power outlets were mostly used incidentally to operate power tools, garage door openers, lighting, etc.

The capacity of the battery bank in an electric vehicle may typically be from 20 to 50 kWh, and fully depleted will require on the order of 10 to 20 hours of charging time when powered from a 120V outlet. This amount of time is generally considered too long by EV owners and for this reason most residential EV charge stations require a dedicated 240 volt outlet, enabling a max power output of 3600 or 4800 VA while still drawing 15 or 20 amperes respectively. Thus, the effect of having a 240V outlet as compared to a 120V outlet is to cut the excessive charging times mentioned above in half.

The need for 240 volts to operate the charge stations available in the market today means that new owners of electric vehicles will have to invest a considerable amount in the installation of a new 240V outlet in the garage area. The cost of the 240V circuit including wiring from the house power panel may well be on the order of $1 000 to $2,000, far exceeding the cost of the charge station itself.

One way of saving the extra cost of a new 240 volt outlet is to convert the original 120V circuit to 240V. The conversion can be done inexpensively without additional wire drawing by exchanging the single circuit breaker in the power panel with a double circuit breaker, thereby converting the former neutral wire in the circuit to a hot wire. However, a negative effect of the conversion is the loss of the 120 volt outlets in the garage area, which were served by the former 120 volt circuit.

There are currently no known charging stations that remedy this problem.

Although several prior art U.S. patents and published patent applications, including U.S. Pat. Nos. 8,072,184 and 8,013,570 and U.S. Patent Application Publication Nos. 2011/0174875 and 2011/0140656, disclose charging stations for electric vehicles having, in some embodiments, charging cords or outlets for charging at 240V, and also charging cords or outlets for charging at 120V, the disclosed charging stations are generally not compatible with the retrofit situation where a home owner desires to convert an existing 120V circuit to 240V without having to pull new wires. None of the references is at all concerned with any type of retrofit method all, and thus according to the references, it is perfectly acceptable for the 240V portion of the charging station to be fed power from a 240V power source, and for the 120V portion of the charging station to be fed power from a separate 120V power source.

Obviously, requiring two separate power sources would completely defeat the purpose of the above-described retrofit method, the crux of which is to allow a single existing 120V circuit to be converted to 240V without pulling additional wires.

SUMMARY OF THE INVENTION

Accordingly, it is an object of the present invention to provide an EV charging solution which allows for EV charging at 240V.

Another object of the present invention is to provide an EV charging solution having the above characteristics and which is less costly to install than previously known solutions.

A further object of the present invention is to provide an EV charging solution having the above characteristics and which is particularly well suited for use in connection with 240V circuits that have been converted from existing 120V circuits commonly found in garage and car port areas.

Still another object of the present invention is to provide an EV charging solution having the above characteristics and which also allows for 120 volt electrical devices to be used in the area of the charging solution even though the circuit in the area has been converted to 240V.

These and other objects of the present invention are achieved in accordance with one aspect of the present invention, as shown in FIG. 4, by provision of a method (40) of retrofitting an area previously supplied with electrical power at 120 volts to supply 240 volt charging for an electric vehicle, while also allowing for 120 volt electrical devices to be used in the area. The method (40) comprises the steps of: (i) converting an existing 120 volt circuit providing electrical power to the area via existing wiring, the existing wiring comprising an existing hot wire and an existing neutral wire, to a 240 volt circuit by converting the existing neutral wire in the 120 volt circuit to a hot wire (step 42); (ii) providing a charging station comprising a 240 volt input, a 240 volt electric vehicle charge plug electrically connected to the 240 volt input, a 240 volt to 120 volt step down transformer, a 240 volt side of the step down transformer electrically connected to the 240 volt input, and a 120 volt power outlet electrically connected to a 120 volt side of the step down transformer (step 44); and (iii) electrically connecting the 240 volt input of the charging station to the converted 240 volt circuit (step 46).

In some embodiments, the existing neutral wire in the 120 volt circuit is converted to a hot wire by exchanging a single circuit breaker in a power panel with a double circuit breaker.

In some embodiments, the area is garage or car port. In some embodiments, the method further comprises the step of electrically connecting existing outlets, lighting and hardwired 120V appliances in the area, which had comprised part of the 120 volt circuit before conversion of the circuit to 240 volts, to the 120 volt side of the step down transformer.

In some embodiments, the method further comprises the step of plugging a 120 volt electrical device into the 120 volt power outlet and operating the 120 volt electrical device. In certain of these embodiments, the 120 volt electrical device comprises a power tool, a garage door opener, or a light.

In some embodiments, the 240 volt input is electrically connected to the converted 240 volt circuit by hard wiring. In some embodiments, the 240 volt input is electrically connected to the converted 240 volt circuit by a receptacle comprising part of the converted 240 volt circuit and a plug comprising part of the 240 volt input.

In some embodiments, the step down transformer comprises a toroidal transformer or a laminated transformer. In some embodiments, the step down transformer comprises an autotransformer or an isolation transformer.

In some embodiments, the charging station further comprises a timer for selectively supplying power to the 240 volt electric vehicle charge plug, and the method further comprises the step of programming the timer to supply power to the 240 volt electric vehicle charge plug so that charging occurs at times when the 120V outlet is anticipated to not be in use or at times when electricity costs are anticipated to be desirable. In certain of these embodiments, the charging station further comprises manual on and off buttons or switches that override the timer so as to selectively supply power to the 240 volt electric vehicle charge plug when desired regardless of a timer program.

In accordance with another aspect of the present invention, an electric vehicle charging system that supplies 240 volt charging for an electric vehicle in an area that had previously been supplied with electrical power at 120 volts, and that also allows for 120 volt electrical devices to be used in the area, is provided. The system comprises a converted 240 volt circuit comprising 120 volt wiring, wherein a neutral wire of the 120 volt wiring has been converted to a hot wire. The system also comprises a charging station comprising a 240 volt input electrically connected to the converted 240 volt circuit, a 240 volt electric vehicle charge plug electrically connected to the 240 volt input, a 240 volt to 120 volt step down transformer, a 240 volt side of the step down transformer electrically connected to the 240 volt input, and a 120 volt power outlet electrically connected to a 120 volt side of the step down transformer. The system further comprises a 120 volt power outlet that had comprised part of the 120 volt circuit in the area prior to conversion to the 240 volt circuit electrically connected to the 120 volt side of the step down transformer.

The invention and its particular features and advantages will become more apparent from the following detailed description considered with reference to the accompanying drawings.

DETAILED DESCRIPTION OF THE INVENTION

Figures 1, 2:
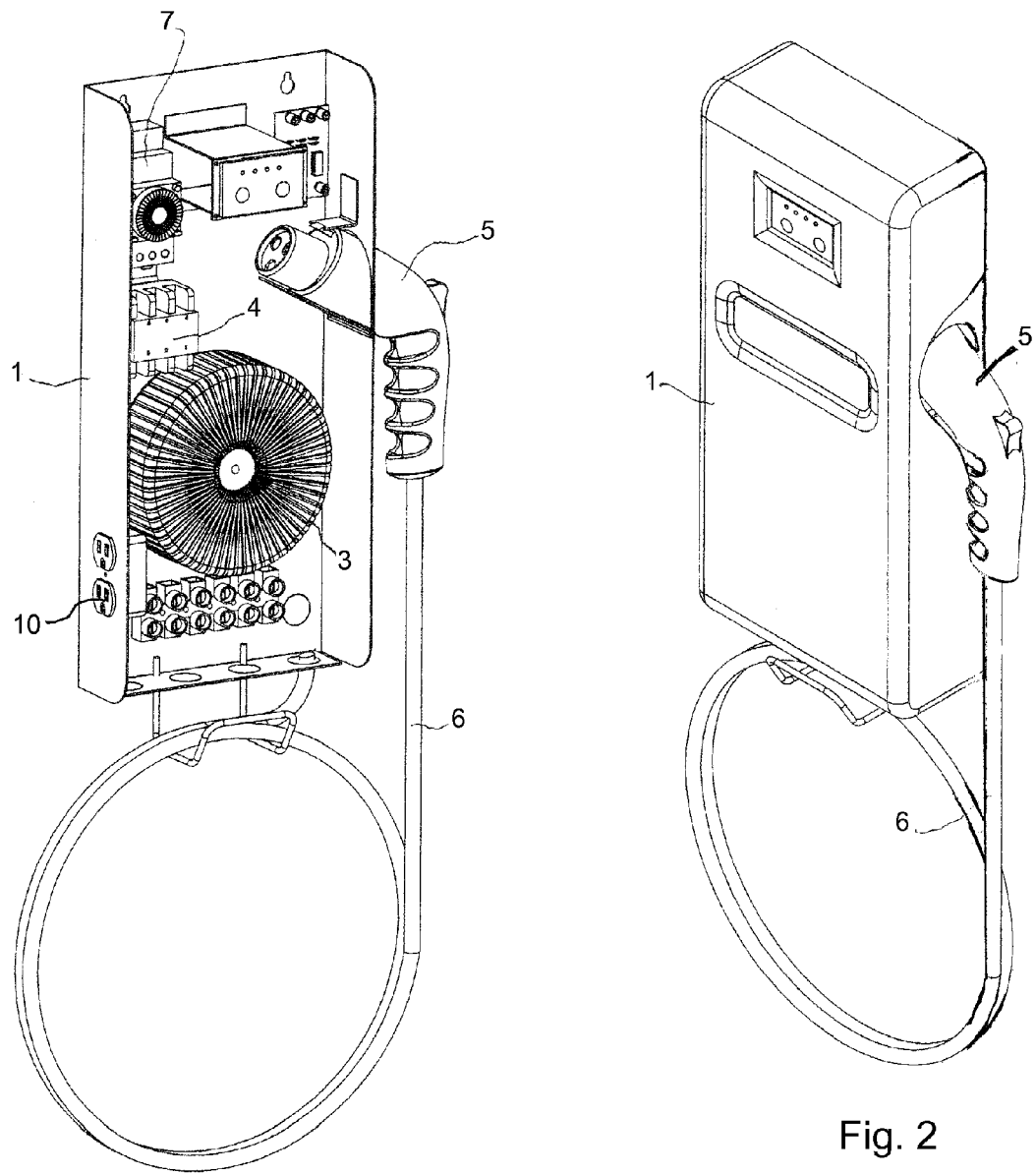
FIG. 1 is an isometric view of an exemplary embodiment of a charge station according to the present invention, shown with the cover removed.
FIG. 2 is an isometric view of the charge station of FIG. 1 with the front cover in place.
Figure 3:
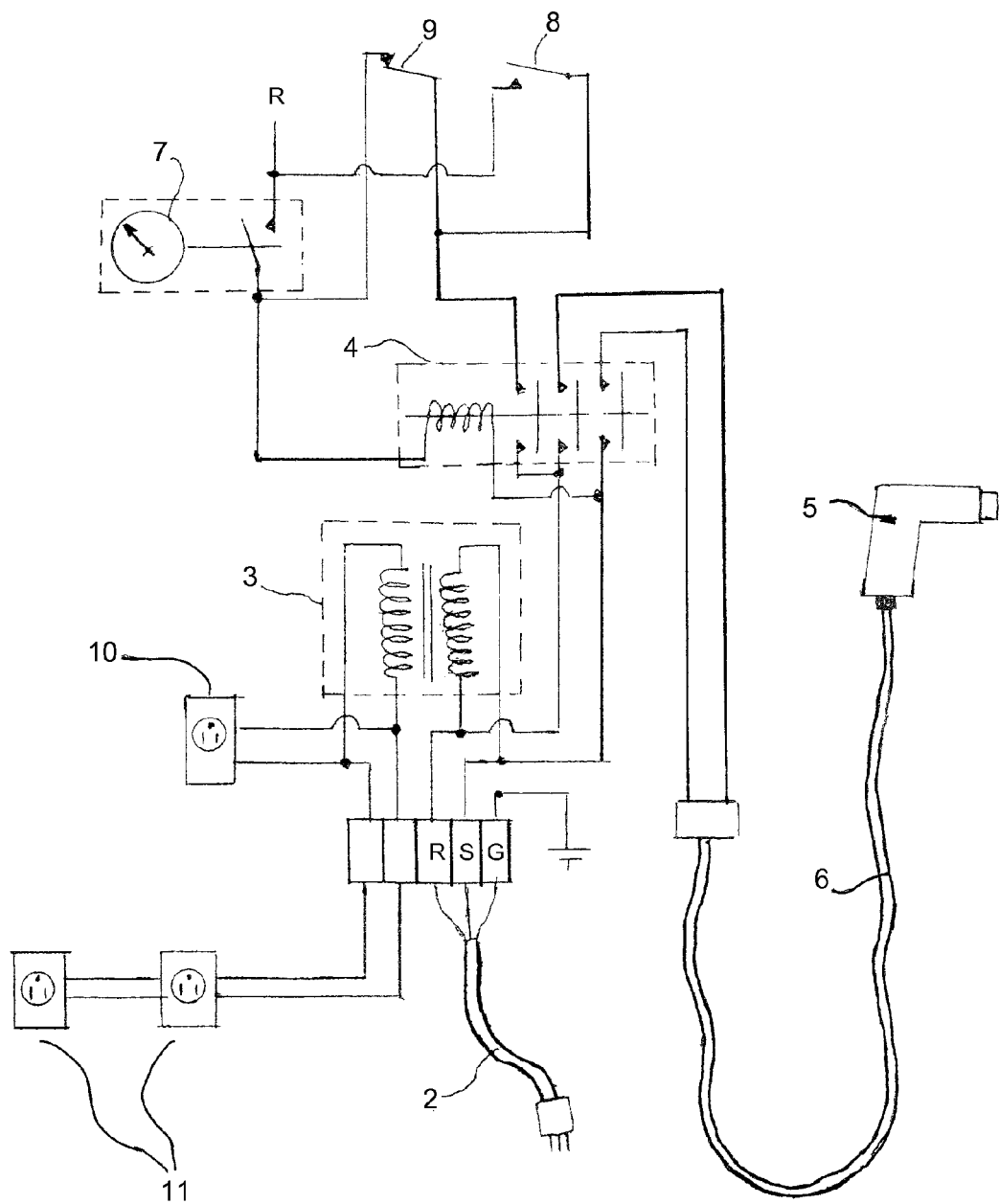
FIG. 3 is a schematic representation showing an exemplary electrical circuit of the charge station of FIG. 1.
Figure 4:
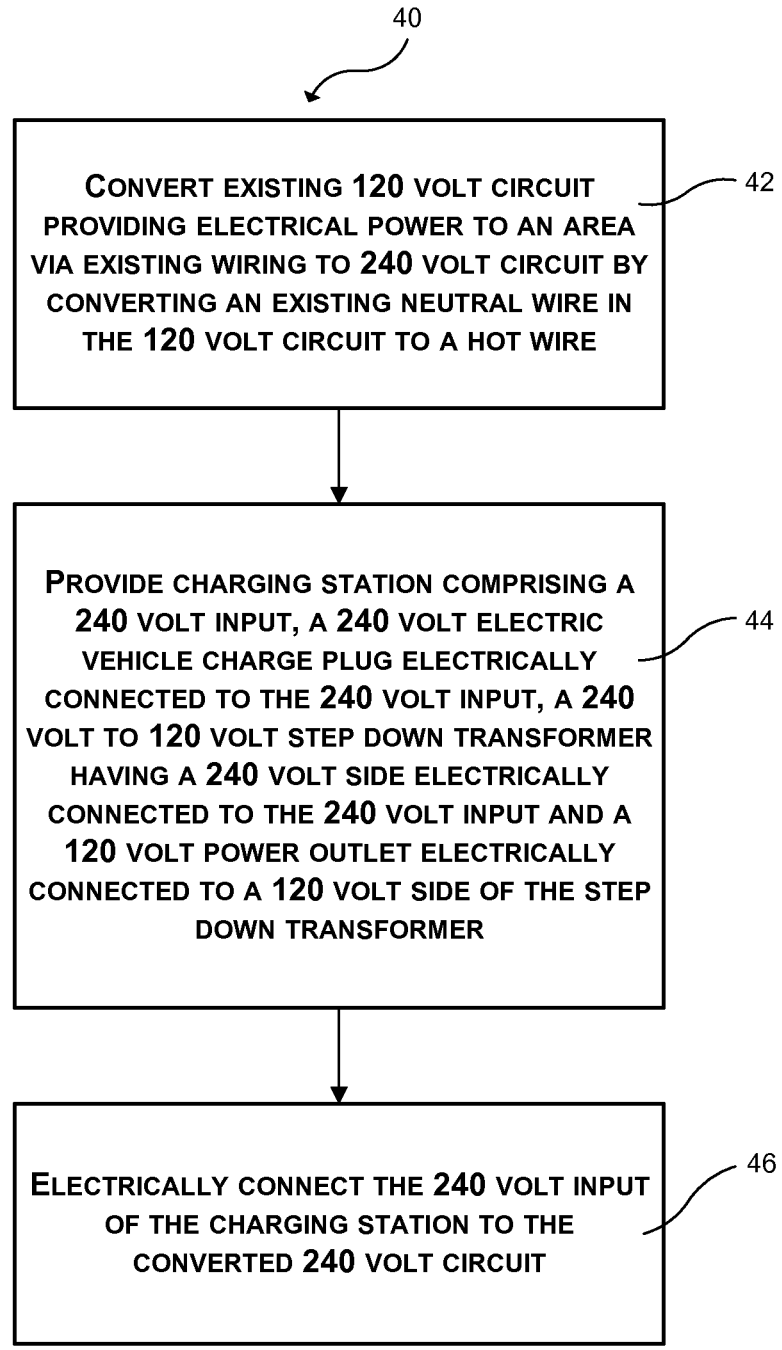
FIG. 4 is a flow chart showing an exemplary method of retrofitting an area previously supplied with electrical power at 120 volts to supply 240 volt charging for an electric vehicle, while also allowing for 120 volt electrical devices to be used in the area, employing the charge station of FIG. 1.

In a general sense, the present invention is directed to a 240V charge station powered from a circuit that has been converted from 120V to 240V, while at the same time restoring 120V service in the garage or car port area.

This double function is achieved by a charge station according to the invention by incorporating a 240V to 120V step down transformer in the charge station. The transformer primary winding is fed from the converted 240V circuit and the secondary winding supplies at least one built-in 120V outlet. Optionally, the secondary winding of the 240V/120V step down transformer may also supply 120V power to additional outlets in the garage or car port area, which would otherwise have been disabled by the conversion.

The charge station according to the invention may also incorporate a programmable 24 hour timing switch, which may delay the start of the charge cycle until a time when little or zero power is drawn from the 120V outlets, thus reserving a maximum of power available for the charging operation. The timer serves a double purpose by also enabling the user to take advantage of possible reduced power rates during night hours.

Referring now to the specific exemplary embodiment shown in the Figures, the charge station 1 of the present invention may be wall or pedestal mounted (wall mounted being shown in the Figures) and is connected with a 240V AC circuit (described more fully below) either by fixed wiring or via a power cord 2 with an appropriate 240V power plug.

Inside the charge station 1, the 240V wires are connected in parallel to the primary winding of a 240V to 120V step down transformer 3, and to the two terminals of a normally open AC contactor 4. The output terminals of the contactor are connected to a pistol grip EV charge plug 5 via a flexible power cable 6.

The coil of contactor 4 is connected to a 24-hour programmable timing switch 7 which is set to start the charge cycle at a predetermined time, e.g., 11:00 PM every night, and stop the cycle in the morning after the lapse of sufficient time to recharge the fully depleted battery. The time switch control may be overridden if desired to begin charging manually by means of a start push button switch 8 which closes a circuit via a set of holding contacts to close contactor 4 closed, and it may be stopped by means of a stop push button switch 9 at any time outside of the period determined by the timer settings.

The step down transformer 3 serves to restore 120V power to at least one 120V outlet 10 located on the charging station 1, and optionally also to additional 120V outlets, lighting and hardwired appliances 11 located in the garage or car port area that had previously been connected to the 120V circuit prior to its conversion to 240V. In the embodiment shown in the Figures, the step down transformer 3, is a toroidal design, but it could equally well be a conventional laminated design, and could be an autotransformer as well as an isolation transformer. Using an isolation transformer in the charge station 1 according to the invention would serve the additional purpose of reducing the risk of electric shock from faulty insulation in power tools and appliances powered from the restored 120V outlets 10, 11.

As discussed above, the charging station 1 of the present invention is particularly adapted for use in connection with a retrofit method, as it allows for a single 240V power circuit to both charge an EV at 240V (resulting in faster charging than can be achieved with a 120V circuit) and also to provide power to 120V tools, garage door openers, lights, etc. that otherwise would be unusable after conversion of the circuit in the area from 120V to 240V.

What is claimed is:

1. A method of retrofitting an area previously supplied with electrical power at 120 volts to supply 240 volt charging for an electric vehicle, while also allowing for 120 volt electrical devices to be used in the area, said method comprising the steps of:
   converting an existing 120 volt circuit providing electrical power to the area via existing wiring, the existing wiring comprising an existing hot wire and an existing neutral wire, to a 240 volt circuit by converting the existing neutral wire in the 120 volt circuit to a hot wire;
   providing a charging station comprising a 240 volt input, a 240 volt electric vehicle charge plug electrically connected to the 240 volt input, a 240 volt to 120 volt step down transformer, a 240 volt side of the step down transformer electrically connected to the 240 volt input, and a 120 volt power outlet electrically connected to a 120 volt side of the step down transformer, wherein the 120 volt power outlet receives power from the step down transformer; and
   electrically connecting the 240 volt input of the charging station to the converted 240 volt circuit.

2. The method of claim 1 wherein the existing neutral wire in the 120 volt circuit is converted to a hot wire by exchanging a single circuit breaker in a power panel with a double circuit breaker.

3. The method of claim 1 wherein the area is garage or car port.

4. The method of claim 1 further comprising the step of electrically connecting existing outlets in the area, which had comprised part of the 120 volt circuit before conversion of the circuit to 240 volts, to the 120 volt side of the step down transformer.

5. The method of claim 1 further comprising the step of plugging a 120 volt electrical device into the 120 volt power outlet and operating the 120 volt electrical device.

6. The method of claim 5 wherein the 120 volt electrical device comprises a power tool, a garage door opener, or a light.

7. The method of claim 1 wherein the 240 volt input is electrically connected to the converted 240 volt circuit by hard wiring.

8. The method of claim 1 wherein the 240 volt input is electrically connected to the converted 240 volt circuit by a receptacle comprising part of the converted 240 volt circuit and a plug comprising part of the 240 volt input.

9. The method of claim 1 wherein the step down transformer comprises a toroidal transformer or a laminated transformer.

10. The method of claim 1 wherein the step down transformer comprises an autotransformer or an isolation transformer.

11. The method of claim 1 wherein the charging station further comprises a timer for selectively supplying power to the 240 volt electric vehicle charge plug, and further comprising the step of programming the timer to supply power to the 240 volt electric vehicle charge plug so that charging occurs at times when the 120V outlet is anticipated to not be in use or at times when electricity costs are anticipated to be desirable.

12. The method of claim 11 wherein the charging station further comprises manual on and off buttons or switches that override the timer so as to selectively supply power to the 240 volt electric vehicle charge plug when desired regardless of a timer program.

13. An electric vehicle charging system that supplies 240 volt charging for an electric vehicle in an area that had previously been supplied with electrical power at 120 volts, and that also allows for 120 volt electrical devices to be used in the area, said system comprising:
   a converted 240 volt circuit comprising 120 volt wiring, wherein a neutral wire of the 120 volt wiring has been converted to a hot wire;
   a charging station comprising:
      a 240 volt input electrically connected to the converted 240 volt circuit;
      a 240 volt electric vehicle charge plug electrically connected to the 240 volt input;
      a 240 volt to 120 volt step down transformer, a 240 volt side of the step down transformer electrically connected to the 240 volt input; and
      a 120 volt power outlet electrically connected to a 120 volt side of the step down transformer, wherein the 120 volt power outlet receives power from the step down transformer; and
   a 120 volt power outlet that had comprised part of the 120 volt circuit in the area prior to conversion to the 240 volt circuit electrically connected to the 120 volt side of the step down transformer.

14. The system of claim 13 wherein the neutral wire of the 120 volt wiring has been converted to a hot wire by electrically connecting the neutral wire to a circuit breaker in a power panel.

15. The system of claim 13 wherein area is garage or car port.

16. The system of claim 13 further comprising a 120 volt electrical device plugged into the 120 volt power outlet comprising part of the charging station or the 120 volt power outlet that had comprised part of the 120 volt circuit in the area prior to conversion to the 240 volt circuit.

17. The system of claim 16 wherein the 120 volt electrical device comprises a power tool, a garage door opener, or a light.

18. The system of claim 13 wherein the 240 volt input is electrically connected to the converted 240 volt circuit by hard wiring.

19. The system of claim 13 wherein the 240 volt input is electrically connected to the converted 240 volt circuit by a receptacle comprising part of the converted 240 volt circuit and a plug comprising part of the 240 volt input.

20. The system of claim 13 wherein the step down transformer comprises a toroidal transformer or a laminated transformer.

21. The system of claim 13 wherein the step down transformer comprises an autotransformer or an isolation transformer.

22. The system of claim 13 wherein the charging station further comprises a timer for selectively supplying power to the 240 volt electric vehicle charge plug.

23. The system of claim 22 wherein the charging station further comprises manual on and off buttons or switches that override the timer so as to selectively supply power to the 240 volt electric vehicle charge plug when desired regardless of a timer program.

24. A method of retrofitting an area previously supplied with electrical power at 120 volts to supply 240 volt charging for an electric vehicle, while also allowing for 120 volt electrical devices to be used in the area, said method comprising the steps of:

converting an existing 120 volt circuit providing electrical power to the area via existing wiring, the existing wiring comprising an existing hot wire and an existing neutral wire, to a 240 volt circuit by converting the existing neutral wire in the 120 volt circuit to a hot wire;

providing a charging station comprising a 240 volt input, a 240 volt electric vehicle charge plug electrically connected to the 240 volt input, and a 240 volt to 120 volt step down transformer, a 240 volt side of the step down transformer electrically connected to the 240 volt input;

electrically connecting the 240 volt input of the charging station to the converted 240 volt circuit; and electrically connecting existing outlets in the area, which had comprised part of the 120 volt circuit before conversion of the circuit to 240 volts, to the 120 volt side of the step down transformer, wherein the existing outlets receive power from the step down transformer.

25. The method of claim 24 wherein the existing neutral wire in the 120 volt circuit is converted to a hot wire by exchanging a single circuit breaker in a power panel with a double circuit breaker.

26. The method of claim 24 wherein the area is garage or car port.

27. The method of claim 24 wherein the charging station further comprises a 120 volt power outlet electrically connected to a 120 volt side of the step down transformer.

28. The method of claim 24 further comprising the step of plugging a 120 volt electrical device into at least one of the existing outlets and operating the 120 volt electrical device.

29. The method of claim 28 wherein the 120 volt electrical device comprises a power tool, a garage door opener, or a light.

30. The method of claim 24 wherein the 240 volt input is electrically connected to the converted 240 volt circuit by hard wiring.

31. The method of claim 24 wherein the 240 volt input is electrically connected to the converted 240 volt circuit by a receptacle comprising part of the converted 240 volt circuit and a plug comprising part of the 240 volt input.

32. The method of claim 24 wherein the step down transformer comprises a toroidal transformer or a laminated transformer.

33. The method of claim 24 wherein the step down transformer comprises an autotransformer or an isolation transformer.

34. The method of claim 24 wherein the charging station further comprises a timer for selectively supplying power to the 240 volt electric vehicle charge plug, and further comprising the step of programming the timer to supply power to the 240 volt electric vehicle charge plug so that charging occurs at times when the existing outlets are anticipated to not be in use or at times when electricity costs are anticipated to be desirable.

35. The method of claim 34 wherein the charging station further comprises manual on and off buttons or switches that override the timer so as to selectively supply power to the 240 volt electric vehicle charge plug when desired regardless of a timer program.

36. A method of retrofitting an area previously supplied with electrical power at 120 volts to supply 240 volt charging for an electric vehicle, while also allowing for 120 volt electrical devices to be used in the area, said method comprising the steps of:

converting an existing 120 volt circuit providing electrical power to the area via existing wiring, the existing wiring comprising an existing hot wire and an existing neutral wire, to a 240 volt circuit by converting the existing neutral wire in the 120 volt circuit to a hot wire;

providing a charging station comprising a 240 volt input, a 240 volt electric vehicle charge plug electrically connected to the 240 volt input, a 240 volt to 120 volt step down transformer, a 240 volt side of the step down transformer electrically connected to the 240 volt input and a 120 volt power outlet electrically connected to a 120 volt side of the step down transformer, wherein the 120 volt power outlet receives power from the step down transformer;

electrically connecting the 240 volt input of the charging station to the converted 240 volt circuit; and electrically connecting existing outlets in the area, which had comprised part of the 120 volt circuit before conversion of the circuit to 240 volts, to the 120 volt side of the step down transformer.

\* \* \* \* \*